(12) United States Patent
Getzelman

(10) Patent No.: US 6,425,639 B1
(45) Date of Patent: Jul. 30, 2002

(54) TIRE ISOLATION DEVICE

(76) Inventor: James W. Getzelman, 24565 Palace Ct., Laguna Niguel, CA (US) 92677

( * ) Notice: Subject to any disclaimer, the term of this patent is extended or adjusted under 35 U.S.C. 154(b) by 0 days.

(21) Appl. No.: 09/947,159

(22) Filed: Sep. 5, 2001

(51) Int. Cl.[7] .............................. B60B 7/00; B65D 51/00; B65D 51/02
(52) U.S. Cl. ..................... 301/37.103; 220/287; 215/225
(58) Field of Search ................. 301/37.101, 37.103, 301/37.104; 220/287; 215/224, 225

(56) References Cited

U.S. PATENT DOCUMENTS

| | | | |
|---|---|---|---|
| 3,974,929 A | * 8/1976 | Montgomery | ............... 215/225 |
| 4,874,206 A | 10/1989 | Sampson | |
| 4,955,670 A | 9/1990 | Koller | |
| 5,392,949 A | * 2/1995 | McKenna | ................... 220/287 |
| 5,423,441 A | * 6/1995 | Conti | ......................... 215/225 |
| 5,423,599 A | 6/1995 | Sherod et al. | |
| 5,435,630 A | 7/1995 | Tucker | |
| 5,524,972 A | 6/1996 | Cailor et al. | |

* cited by examiner

Primary Examiner—S. Joseph Morano
Assistant Examiner—Jason R. Bellinger
(74) Attorney, Agent, or Firm—James G. O'Neill

(57) ABSTRACT

A tire isolation device has a cylindrical body with a closed end having a number of different length concentric tire sealing elements mounted at different diameters on an inner surface. An outer surface of the closed end has a handle and a number of pull strips mounted concentrically and at equivalent diameters to the concentric sealing elements to enable a user to remove the pull strips to adjust the diameter of the tire isolation device to cover selected diameter wheels or wheel covers to protect the same during cleaning or chemical treatment.

14 Claims, 2 Drawing Sheets

TIRE ISOLATION DEVICE

BACKGROUND OF THE INVENTION

1. Field of the Invention

This present invention relates generally to protective devices, and more particularly, to an improved tire isolation device for use when cleaning and spraying vehicle tires.

2. Description of Related Art

As is well known, to dress up and/or clean motor vehicle tires, many individuals spray the tires with a cleaner and/or a protective shiny coating. However, such tire cleaners and protective coatings run onto or are over-sprayed onto the motor vehicle's wheels or wheel covers (hereinafter collectively referred to as "wheels"). Such runoff or over-spray leaves an unsightly deposit or residue on the wheels or can, in some instances, cause dulling or pitting of the finish of wheels.

To overcome this problem, numerous devices have been developed to cover or protect a vehicle's wheels for painting, washing or during chemical tire cleaning and/or treatment. Examples of such devices are disclosed in U.S. Pat. Nos. 4,874,206, 4,955,670, 5,423,599, 5,435,630 and 5,524,972.

However, none of these known devices appear to have met with commercial success. This is probably due to the fact that most of the known devices attach to the inside or outside diameter of wheel rims, and do not always completely cover or mask wheels. For example, if balancing weights are on the wheels, the known devices cannot be used, because of lack of clearance or no place to attach. Other known devices are unduly complex and not easy to use, or require further tools to trim to size. Furthermore, present day wheels do not always have a rim, and many of the known devices are too bulky and expensive, or do not easily accommodate such rims, nor are they easily changed to fit all available wheel sizes.

Therefore, there still exists a need in the art for a device to isolate or protect vehicle wheels during cleaning or treatment of tires mounted on the wheels in an inexpensive, effective, easy-to-use device that is easily and quickly sized, without requiring tools, so as to fit all wheel sizes, and maximize protection of the wheels.

SUMMARY OF THE INVENTION

Accordingly, it is a general object of the present invention to provide an improved and simplified tire isolation device. It is a particular object of the present invention to provide an improved and simplified tire isolation device that accommodates the many available variations in wheel designs and sized to protect the same. It is a further particular object of the present invention to provide an improved and simplified tire isolation device having a plurality of perpendicular, cylindrical sealing elements secured together by holding strips having pull handles incorporated therewith to easily remove unwanted portions of the device so as to fit over and protect a selected wheel size.

These and other objects of the present invention are achieved by providing a tire isolation device for placement over a tire's central opening or a wheel to completely cover the opening or protect the wheel during cleaning or treatment of the tire. The device includes a generally cylindrical body having a handle on an outside surface and a plurality of concentric tire sealing elements on an inner surface. The plurality of concentric tire sealing elements are secured together by concentric holding strips having pull handles connected thereto. When it is desired to change the size of the device to cover and protect a selected central opening or size wheel, a selected concentric holding strip is removed by pulling a selected pull-handle to thereby remove the selected concentric holding strip and all of the concentric tire sealing elements located radially outwardly from the removed selected concentric holding strip.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
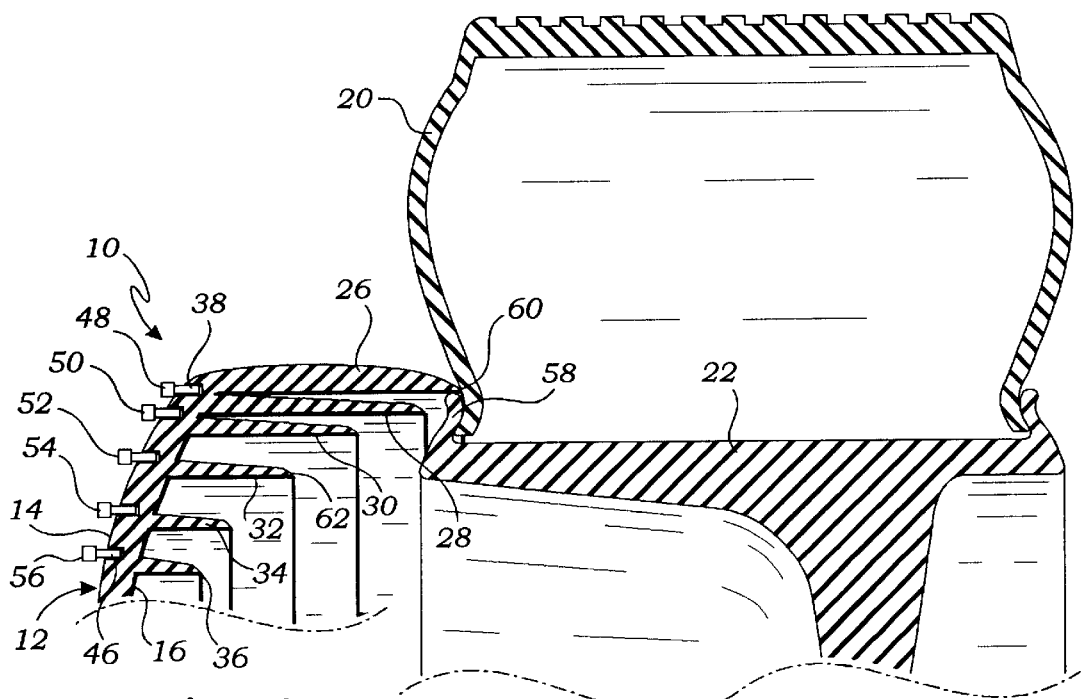
FIG. 1 is a partial cross-sectional view of a device of the present invention sealed against a vehicle tire held on wheel rim.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified tire isolation device generally indicated at 10. The device 10 is preferably generally cylindrical in shape and has a body 12 with a closed end that is preferably domed, with an outer surface 14 and an inner surface 16. The outer surface 14 includes a handle 18 secured at a central portion thereof to enable the device 10 to be easily picked up and moved, or placed against a tire 20 to cover and protect a wheel opening or a wheel 22 (FIG. 1) or 24 (FIG. 2) during cleaning or treating.

It is to be understood that the device 10 may be made of any suitable lightweight, but strong material, such as a plastic. Preferably, the device is made from polyethylene. The overall shape of the device 10 is preferably cylindrical with a closed dome-like end for strength, and is designed to fit any available wheel size, such as from 13" to 23", as explained more fully below.

The device 10 is preferably injection-molded so as to be low in cost, yet effective in strength and durability. In particular, since the device 10 does not have break-away portions, it is not susceptible to being easily broken or changed in size, except as specified below.

As shown in the drawings, the device 10 includes a plurality of inwardly extending, different length concentric tire sealing elements or portions such as, 26, 28, 30, 32, 34, 36. These tire sealing elements, such as 26 and 30 shown in FIGS. 1 and 2, when pressed against the sidewall of a tire 20, completely cover and protect the wheels 22, 24 on which the tire is mounted.

Figure 3:
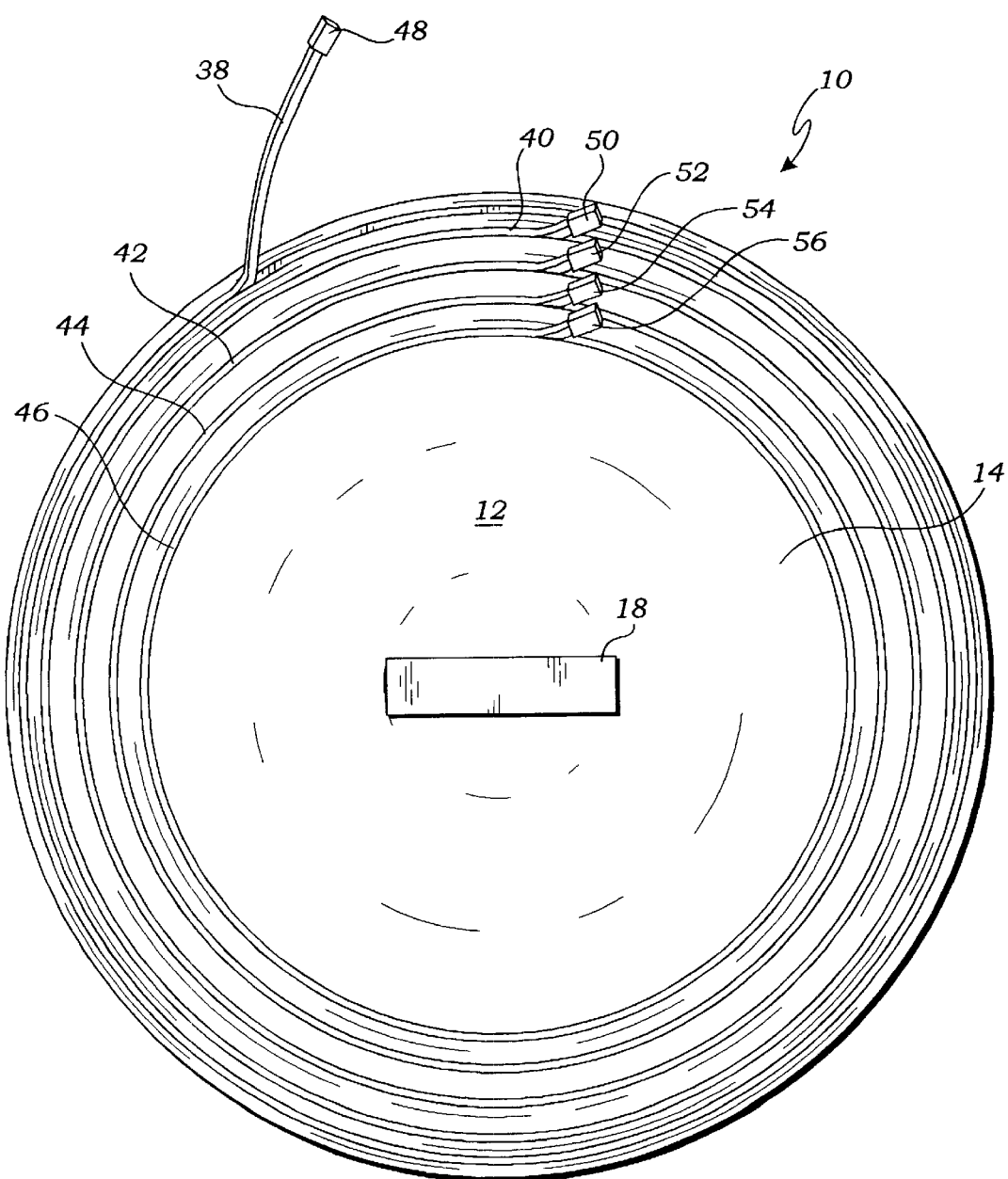
FIG. 3 is a top plan view of a device of the present invention.

As best shown in FIG. 3, to enable the concentric tire sealing elements to be easily removed so as to size the device 10 to fit over and cover selected size tire openings or wheels, a plurality of concentric removable holding or pull strips 38, 40, 42, 44, 46 are provided. Although shown on the outer surface 14, it is to be understood that the pull strips could also be mounted on the inner surface 16 of the closed end. Each of these holding or pull strips is formed in a thinned area in the outer or inner surface of the closed end at or adjacent to the base of a respective tire sealing element, and includes a handle or pull tab 48, 50, 52, 54, 56. The pull tabs and pull strips allow the device 10 of the present invention to be easily sized to fit over a selected tire opening or wheel size by merely grasping the pull tab, such as 48, and pulling the pull strip, such as 38, off the closed end around the entire outer periphery of the base of one of the tire sealing elements of the device 10 (see FIG. 3).

Figure 2:
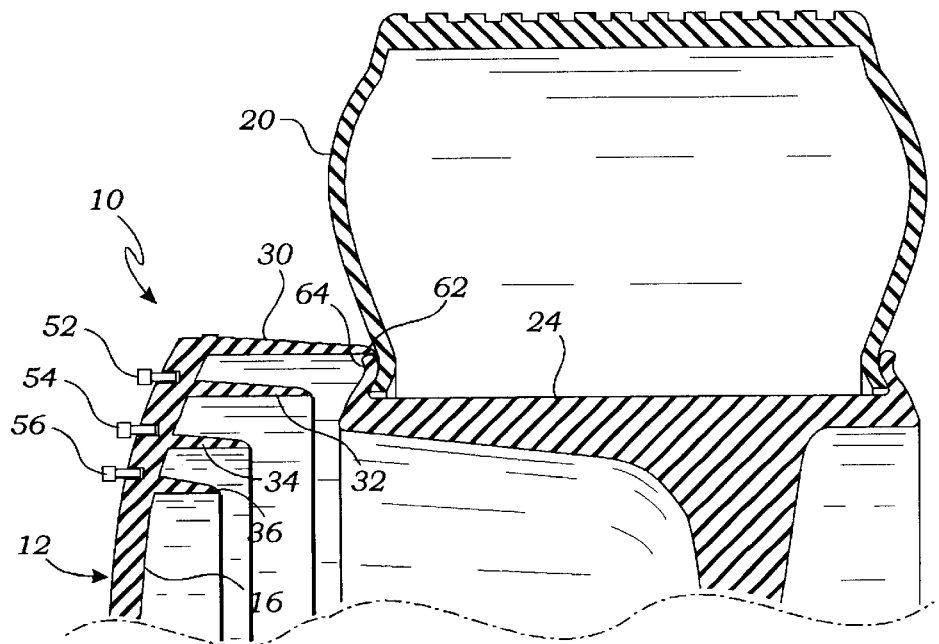
FIG. 2 is a further partial cross-sectional view of the device of the present invention sealed against a vehicle tire held on a smaller rim, with a peripheral portion of the device removed.

Turning now to FIGS. 1 and 2, the use of the device of the present invention will now be described. If the rim on the tire 20 to be cleaned or treated is of the largest size, such as 19" to 23", to be covered by the device 10, the device is grasped by the handle 18 and placed over an outer edge 58 of the rim of the wheel 22, so that a narrow outer edge or knife edge portion 60 of the outer concentric tire sealing element 26 is pressed against the sidewall of tire 20. This sealing edge 60 presses against the surface of the sidewall at approximately 90°, closely adjacent to the outer edge 58, so as to clear any obstructions on the outer edge. That is, a clearance of approximately 1/64" to 1/8" is preferably allowed between the inner diameter of the tire sealing element 26 and the diameter of the outer edge 58 of the wheel to allow the knife edge 60 or 62 to clear any obstruction on the outer edge 58 or 64, such as balancing weights, oversize wheel covers, or the like. This clearance allows the knife edge 60 or 62 to be firmly seated against the sidewall of the tire, so as to form a tight seal therewith and prevent leakage of water or chemical treatments under the edge and onto the covered wheel. The narrow, tapered or knife edge of each tire sealing element, such as 60 (FIG. 1) or 62 (FIG. 2) minimizes the contact area with the tire sidewall to maximize coverage of the tire cleaning or treatment area.

When it is desired to change the size of the device 10, a selected pull handle or tab 48–56, which handles or tabs are preferably marked with wheel sizes, such as 13", 14", 15", 16" 17", etc., is grasped. The grasped pull handle is then pulled to remove a strip of sealing material, such as 38 shown in FIG. 3, or 50 shown removed in FIG. 2. When the sealing material has been fully removed with the peripheral material radially outwardly therefrom, a further outer tire sealing element is exposed, such as 30. The pull trim feature maintains a smooth, factory-type finished fit to the outer sealing element thus exposed. Furthermore, no tools or dangerous cutting edges or instruments are required to trim the device 10 to the required fit. There also will be no gaps, tears or other imperfections or rough areas that could hinder the effectiveness and/or use of the device.

The concentric tire sealing elements 28, 30, 32, 34 and 36 are of different lengths so as to provide the best contact against a tire on a selected wheel size and to avoid interference with tire attachments and accessories when placed over a wheel. Each of these concentric tire sealing elements is preferably secured to or formed integrally with the tapered or domed inner wall 16 of the closed end at a selected angle so as to extend parallel to each other and so as to contact a tire sidewall, adjacent an outer rim edge of the respective tire sealing element, at approximately 90° to to the tire sidewall. Each of the tire sidewall contact edges of the various sealing elements are preferably tapered or formed as a knife-type edge, as explained above, in connection with sealing elements 26 and 30.

There has thus been described a novel and unique tire isolation device that is adapted to fit substantially any size vehicle wheel so as to cover and protect such wheels during cleaning or treatment with chemical substances. The device is easily and quickly sized to fit any available wheel by use of pull tabs and holding strips, without the need for further tools.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A tire isolation device for placement over a tire opening, or a vehicle wheel or wheel cover mounted on a tire, comprising:

a substantially cylindrical body having a domed substantially closed end with an inner surface and an outer surface;

a handle connected to the outer surface of the substantially cylindrical body;

a plurality of concentric tire sealing elements connected to the inner surface of the substantially cylindrical body at predetermined diameters; and wherein the substantially cylindrical body includes a plurality of concentric holding strips having pull handles thereon at equivalent diameters to the tire sealing elements to enable a user to decrease the diameter of the substantially cylindrical body by removing a selected holding strip, and all material, radially outwardly from the selected holding strip.

2. The tire isolation device of claim 1 wherein the plurality of concentric tire sealing elements are of different lengths and on the outer periphery of the substantially cylindrical body.

3. The tire isolation device of claim 2 wherein the pull handles include indicia thereon to indicate a wheel size that may be covered, once the indicated pull handle is pulled and the selected holding strip removed.

4. The tire isolation device of claim 3 wherein the plurality of concentric tire sealing elements of different lengths have tapered outer ends for contact with a sidewall of the tire mounted on the wheel.

5. The tire isolation device of claim 4 wherein the plurality of concentric tire sealing elements of different lengths extend so as to contact a tire sidewall at approximately 90°.

6. The tire isolation device of claim 1 wherein the plurality of concentric tire sealing elements have tapered outer ends.

7. The tire isolation device of claim 6 wherein the plurality of concentric tire sealing elements have different lengths.

8. The tire isolation device of claim 7 wherein the plurality of concentric tire sealing elements extend from the inner surface at angles that allow them to be pressed against a tire sidewall at approximately 90°.

9. The tire isolation device of claim 8 wherein the pull handles include indicia thereon to indicate the size of a wheel to be covered by the tire isolation device, if the indicated handle and attached holding strip are removed from the device.

10. A tire isolation device for placement over a tire opening or a vehicle wheel or wheel cover mounted on a tire, comprising:

a substantially cylindrical body having a closed domed end and an open end;

the closed domed end having an inner surface and an outer surface;

a handle mounted in a central portion of the outer surface;

a plurality of concentric tire sealing elements extending from an outer peripheral portion of the inner surface; and a plurality of concentric holding strips having pull handles secured thereto mounted on the closed domed end at equivalent diameters to the plurality of concentric tire sealing elements, whereby when a user grasps a selected pull handle and removes one of the concentric holding strips and all material radially outwardly from the removed holding strip, the diameter of the substantially cylindrical body will be decreased.

11. The tire isolation device of claim 10 wherein the plurality of concentric tire sealing elements are of different lengths and have tapered outer ends.

12. The tire isolation device of claim 11 wherein the plurality of concentric tire sealing elements are secured to the inner surface so as to extend at angles that allow them to contact a sidewall of a tire, adjacent an outer edge of a holding rim at approximately 90°.

13. The tire isolation device of claim 12 wherein the pull handles include indicia thereon indicative of a wheel size that may be covered by the tire isolation device once the indicated pull handle and attached holding strip are removed from the device.

14. A tire isolation device for placement over different size tire openings or vehicle wheels or wheel covers having tires mounted on rims of the wheels, comprising:

a substantially cylindrical body having a closed domed end and an open end;

the closed domed end having an inner surface and an outer surface;

a handle mounted on the outer surface;

a plurality of pull handles and concentric holding strips formed in the closed domed end adjacent an outer peripheral edge thereof; and a plurality of concentric, different length tire sealing elements mounted on the inner surface and having tapered inner ends for contacting a tire sidewall, and being located at equivalent diameters to the plurality of concentric holding strips.

* * * * *